March 18, 1952

L. H. ORPIN 2,589,851

PULSE LENGTH DISCRIMINATOR

Filed Jan. 3, 1946

INVENTOR.
LIONEL H. ORPIN
BY
William D. Hall,
ATTORNEY

Patented Mar. 18, 1952 2,589,851

UNITED STATES PATENT OFFICE 2,589,851

PULSE LENGTH DISCRIMINATOR

Lionel H. Orpin, Greece, N. Y., assignor, by mesne assignments, to the United States of America as represented by the Secretary of War Application January 3, 1946, Serial No. 638,890

9 Claims. (Cl. 250—27)

This invention relates to an electric wave circuit, and, more particularly, to an electrical pulse length discriminator circuit.

An object of the invention is to simplify circuit arrangements for determining whether a random electrical pulse input to the circuit is of sufficient duration or length to warrant or to produce an output pulse from the circuit.

A feature of the invention comprises associating an impedance network or oscillatory circuit with a path common to the input and output circuits, and, specifically, in the so-called cathode-to-ground path, of an electronic device or vacuum tube, for discriminating against electrical pulse lengths applied to the input circuit of other than preassigned duration or length.

In general, the invention may be embraced within a circuit arrangement comprising an electronic device including input and output electrodes and associated input and output circuits. The device may be adjusted to that of appreciable electron flow therethrough. Common to the input and output circuit of the device, may be an oscillatory circuit or impedance network, electrically coupled to a suitable load or other utilization circuit. The constants of the network are chosen so that, of the random electrical pulses that may be applied to the input circuit, only an electrical pulse of preassigned minimum length or duration causes development of potential change in the network sufficient, when transferred to the other circuit, to cause the predetermined effect desired in the latter. Specifically, the network may comprise parallel-connected inductor and condenser whose period of oscillation is chosen so as to discriminate between applied input pulses of duration or length less and greater than one-half the oscillation period of the network. The load circuit may include an additional electronic device and associated input and output circuits for amplifying and sharpening the output pulse.

A more complete understanding of the above and other objects and features of the invention will be derived from the detailed description that follows, read with reference to the appended drawing, wherein.

Figure 1:
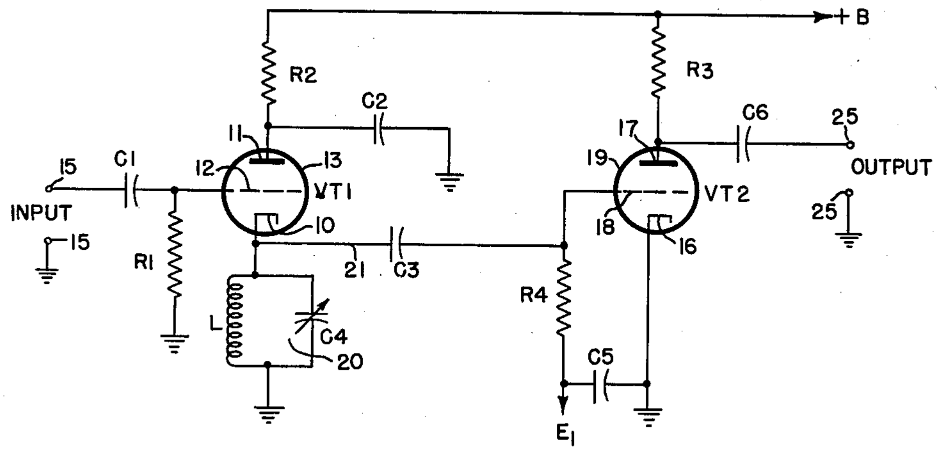
Fig. 1 illustrates a circuit arrangement embodying the invention.

With reference to the drawing, Fig. 1 illustrates a circuit arrangement embodying the invention. VT1 is an electronic device or vacuum tube comprising an electron source or cathode 10, an electron collector electrode such as a target or anode 11 and an electron flow control element or grid 12, interposed in the electron path between the cathode and anode, the electrodes being enclosed in a suitable evacuated envelope 13. The input circuit to the vacuum tube's cathode and grid comprises input terminals 15, 15, condenser C1, resistor R1. A suitable source (not shown) of random electrical pulses may be connected to the circuit through the input terminals. The output circuit of tube VT1 includes its cathode and anode, the latter being connected through resistor R2 to the high potential terminal of a suitable source of potential whose low potential terminal may be connected to ground. An impedance or oscillatory circuit or network 20 comprising parallel-connected inductor L and capacitor C4 is included in a path common to the cathode-grid and cathode-anode circuits of tube VT1, being connected in the so-called cathode-to-ground return. The condenser C4 is shown as variable to indicate that the oscillation period of the network may be adjusted to different values, but, in a specific circuit or system application, it may be desired to have a single fixed oscillation period, in which event a condenser of fixed capacity may be employed. For normal condition of tube VT1, that is, when no electric wave input is applied to terminals 15, or when the electrical input thereto is of a pulse or pulses of duration less than the pulse length the circuit of tube VT1 is adapted to pass, the electrodes 10, 11, 12 are adjusted to potentials establishing an appreciable electron flow through tube VT1.

A second electronic device or vacuum tube VT2 may be provided to amplify and invert the pulse passed by the initial stage of the circuit of Fig. 1. Tube VT2 comprises an electron source or cathode 16, an electron target or anode 17 and an electron-flow control element or grid 18 within a suitable evacuated envelope 19. The input circuit of tube VT2 includes cathode 16, grid 18, resistor R4, condenser C5, the grid being biased normally to a potential negative with respect to the cathode 16 sufficient to block or prevent electron flow between the cathode 16 and anode 17. An electrical coupling 21 including condenser C3 connects the cathode end of the network 20 to the grid 18 of tube VT2 for transferring potential change across the network to the input circuit of tube VT2. The output circuit of tube VT2 includes its cathode and anode, the latter being connected through a resistor R3 to the high potential terminal of the indicated source of anode potential, the pulse-transmitting condenser C6 and the pulse output terminals 25, 25.

The described circuit is adapted to accept negative pulses applied to its input terminals 15, 15, and to provide at the output of its basic stage, i. e., that of the tube VT1, a positive pulse when the applied negative pulse is of greater duration than a preassigned value. The circuit may be employed, for example, to discriminate between search and beacon pulses in a radio object locating system beacon in which the search pulses might be of the order of one microsecond and the beacon pulses might be of the order of two microseconds duration. More generally, the circuit is adapted to discriminate with respect to pulses in a random pulse input such that only a pulse or pulses of preassigned minimum duration will be transmitted through the output circuit of tube VT1 or be effective to produce an output pulse.

Figure 2:
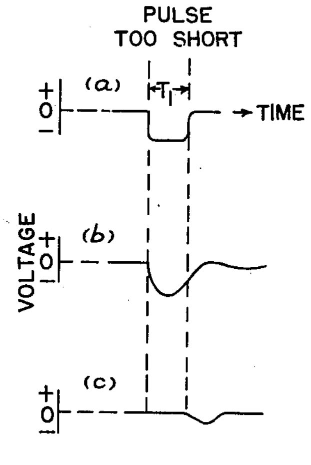
Figs. 2 and 3 represent instantaneous potential conditions existing in the circuit of Fig. 1 for applied input pulses of different durations or lengths.
Figure 3:
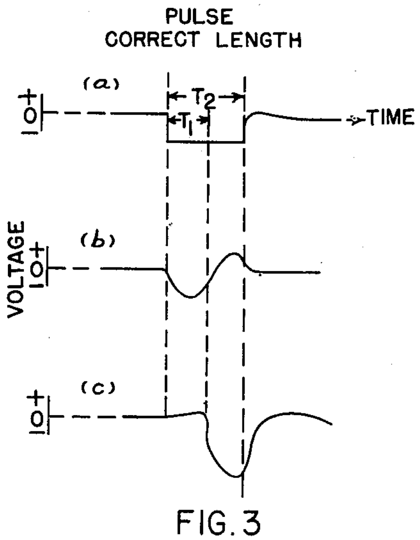

In operation, when a negative electric pulse of appropriate amplitude and of length greater than the period determined by the constants of the network 20, is applied to the terminals 15, 15, a train of exponentially damped oscillations is initiated at the cathode 10. These oscillations start at the instant the negative pulse is applied to the grid 12 and go negative at that instant because of cessation of current through the inductor L. Since the grid 18 of tube VT2 is biased, by potential applied from source E1, to cathode-anode current cut-off in tube VT2, no signal will appear at terminals 25, 25, until the voltage at cathode 10 begins to rise. Should the negative pulse at the input terminals end before the first half-cycle of the oscillations in network 20 is completed, there will be no positive voltage to be transferred to the grid of tube VT2, and the output of the latter will be substantially unaffected by the application of the pulse to the terminals 15, 15. Fig. 2 illustrates in (*b*) and (*c*) thereof the effect on the potential of grid 18 of tube VT2 and on the potential at output terminals 25, 25, of the pulse illustrated in (*a*) applied to input terminals 15, 15, and of a duration less than one-half the oscillation period of the network. On the other hand, should the negative signal at the input terminals last longer than the time required by the network 20 to complete one-half cycle, a positive pulse will be transferred by condenser C3 to the grid 18 with a resulting larger negative output pulse at terminals 25, 25. Fig. 3 illustrates in (*a*) a negative pulse of correct length or duration relative to the oscillatory period of network 20, in (*b*) the potential charge on the grid 18 resulting from the potential transferred from network 20 through condenser C3, and in (*c*) the negative pulse appearing at terminals 25, 25.

In the conventional application of a discriminator circuit, the output pulse is used to initiate further electronic action, such as starting a coder or a modulator, and such latter device generally requires a pulse of preassigned amplitude for a trigger, so that small voltage fluctuations are of no consequence if the output pulse is sufficiently great when a pulse of the correct or greater duration is applied to the input of the basic circuit.

In a circuit arrangement constructed in accordance with this invention such as shown in Fig. 1, the components had the following values: R1—100,000 ohms; R2—15,000 ohms; R3—2,000 ohms; R4—one megohm; C1—.01 mfd.; C2—.1 mfd.; C3—.001 mfd.; C4—.0001 to .0005 mfd., variable; C5—.01 mfd.; C6—.001 mfd.; L—.003 henry.

The circuit described is one of high order of stability. The output of the basic stage will not vary appreciably with charges in B-voltage or temperature if the inductor L and condenser C4 are selected with the proper temperature characteristics. The second triode stage is also stable except possibly insofar as the effect of changes in E1 are concerned. Since the second stage is intended to serve as an amplifier and inverter, it may be replaced by other circuits which serve a similar function, or may be dispensed with if the input circuit of the coder or other utilization equipment which follows is properly designed. Obviously, the invention requires the use of only one vacuum tube triode section, and a minimum of resistors and condensers, thereby enabling light weight and compactness. If the minimum pulse length to be accepted or transmitted by the circuit is fixed for a particular application, condenser C4 may be of the fixed mica type instead of the variable type. Consequently, no adjustments should be necessary if the bias voltage E1 does not vary too widely. If a regulated bias supply should be available in the system or equipment of which this invention might be a part, obviously a bleeder or potentiometer could be used across such supply with satisfactory results.

The arrangement described herein is adaptable to any type of radio object locating beacon which requires a pulse-length discriminator circuit that will produce an output for pulses of duration greater than a certain preassigned value. It may be substituted for the blocking oscillator type discriminator where it is considered desirable to avoid the use of a blocking oscillator transformer. With proper choice of constants and tubes, it can be designed to give comparable performance to any other known type of discriminator.

Although this invention has been disclosed with reference to a preferred embodiment, it will be appreciated that it is not limited thereto, but is of a scope evidenced by the prior art and the appended claims.

What is claimed is:

1. A circuit comprising a vacuum tube having a cathode, an anode, and a control grid interposed in the path between said cathode and anode, an input circuit for applying an input pulse to said cathode and grid, an output circuit comprising said cathode and anode, said output circuit including a resonant circuit for producing shock-excited oscillations in response to the application of said input pulse, a utilization means including a second vacuum tube having a cathode, an anode, and a control grid interposed in the path between said cathode and anode, means to bias the grid of said second vacuum tube negative with respect to its cathode beyond cathode-anode current cutoff, and means for applying said shock-excited oscillations to the grid and cathode of said second tube in such phase that the initial half-cycle of said oscillations renders the grid of said second tube more negative with respect to the cathode thereof, the amplitude of the first cycle of said oscillations being sufficient to render said second tube conducting during the second half-cycle of said oscillations.

2. A circuit comprising an electronic device having an electron source and a collector electrode for electrons originating in said source, and an electron flow control element for regulating electron movement between said collector electrode and source, an input circuit for applying pulses between said source and element, an output circuit including said source, said collector electrode, and a network having a preassigned oscillation period for producing shock-excited oscillations in response to the application of a pulse, a utilization circuit which is responsive only to a potential of given polarity, and means responsive to the output of said network for applying said oscillations to said utilization circuit in such phase that the polarity of the first half-cycle of the oscillations applied to said utilization circuit is opposite said given polarity.

3. A circuit comprising an electronic device having an electron source, a collector electrode for electrons originating at said source, and a control element for regulating electron flow between said collector electrode and source, an input circuit for applying a pulse between said control element and source, an output circuit for said device including said source and collector electrode, said input and output circuits including means for normally maintaining electron flow between said source and collector electrode, an oscillatory electrical network common to the input and output circuits of said device for producing shock-excited oscillations in response to said pulse, utilization means responsive only to a potential of predetermined magnitude, and means for electrically coupling said network and said utilization means in such phase that potential change developed in said network when an electric pulse is applied to the input circuit of said device does not reach said predetermined magnitude until the second half-cycle of shock-excited oscillations developed in said network in response to said electrical pulse.

4. A circuit comprising an electronic device having an electron source, an electron collector electrode, and a control element for regulating electron flow between the source and target, an input circuit for applying a pulse between said source and element, an output circuit for said device including said source and collector electrode, an oscillatory network in the output circuit of said device for producing shock-excited oscillations in response to said pulse, a utilization circuit which is controlled by a potential of given magnitude applied thereto, and means for coupling said network to said utilization circuit for transferring potential changes in said network to said utilization circuit in such phase that said given potential is not reached until the second half-cycle of the shock-excited oscillations developed in said network in response to an applied electrical pulse.

5. A pulse length discriminating circuit comprising a vacuum tube having cathode, control grid, and collector electrodes, a source of space-current potential connected between said collector electrode and a point of reference potential, means to render said tube normally conducting, an oscillatory network connected between said cathode and said point of reference potential, means for applying a negative pulse between said control grid and said point of reference potential to render said tube non-conducting and produce shock-excited oscillations in said network, and a normally inoperative polarized utilization means coupled to said cathode and adapted to be rendered operative by a rise in potential at said cathode, whereby said utilization means is only rendered operative if the length of said pulse is greater than half the oscillation period of said network.

6. A pulse length discriminating circuit according to claim 5, wherein said utilization means comprises a second, normally non-conducting vacuum tube, having a cathode, a control grid, and an anode, means for connecting cathode of said second tube to said point of reference potential, and means for applying the potential at the cathode of said first-mentioned tube to the control-grid of said second tube, whereby said second tube is rendered conducting only when the duration of said pulse is greater than half the oscillation period of said network.

7. A pulse length discriminating circuit comprising an electron tube having a cathode electrode and a positively biased electrode defining a space-current path and a control electrode for controlling the flow of electrons in said path, means to render said tube normally conducting, an input circuit for applying a negative pulse between said control and cathode electrodes to render said tube non-conducting, an oscillatory network in said space-current path for producing shock-excited oscillations in response to the application of said pulse, normally inoperative utilization means which is rendered operative by a given potential applied thereto, means for applying the shock-excited oscillations to said utilization means in such phase that said given potential is not achieved until the second half-cycle of said oscillations, and means for immediately damping said shock-excited oscillations in response to the resumption of conduction by said tube upon the termination of said applied pulse.

8. A circuit according to claim 7, wherein said damping means includes means for degeneratively coupling the space-current circuit of said tube to said input circuit.

9. A circuit according to claim 7, wherein said oscillatory network is connected to said tube as a cathode follower load circuit to provide degenerative coupling.

LIONEL H. ORPIN.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,181,309 | Andrieu | Nov. 28, 1939 |
| 2,288,554 | Smith | June 30, 1942 |
| 2,440,278 | Labin et al. | Apr. 27, 1948 |